US007949735B2

(12) United States Patent
Edwiges et al.

(10) Patent No.: US 7,949,735 B2
(45) Date of Patent: May 24, 2011

(54) TRANSACTION PROCESS FOR THE PROVISIONING OF RULES IN A RULE-BASED NETWORK

(75) Inventors: Maurice Edwiges, St. Pierre du Perray (FR); Julien Robinson, Paris (FR)

(73) Assignee: Alcatel, Paris (FR)

( * ) Notice: Subject to any disclaimer, the term of this patent is extended or adjusted under 35 U.S.C. 154(b) by 1143 days.

(21) Appl. No.: 10/885,754

(22) Filed: Jul. 8, 2004

(65) Prior Publication Data

US 2005/0015503 A1    Jan. 20, 2005

(30) Foreign Application Priority Data

Jul. 18, 2003  (FR) ..................................... 03 08772

(51) Int. Cl.
*G06F 15/177* (2006.01)
(52) U.S. Cl. ....................................................... 709/222
(58) Field of Classification Search .................... 709/222
See application file for complete search history.

(56) References Cited

U.S. PATENT DOCUMENTS

| | | | |
|---|---|---|---|
| 5,594,792 A * | 1/1997 | Chouraki et al. ............. | 379/269 |
| 5,615,359 A * | 3/1997 | Yung ............................... | 707/10 |
| 5,726,979 A * | 3/1998 | Henderson et al. ........... | 370/254 |
| 5,907,696 A * | 5/1999 | Stilwell et al. .................. | 703/13 |
| 6,542,595 B1 * | 4/2003 | Hemzal ..................... | 379/201.03 |
| 6,980,558 B2 * | 12/2005 | Aramoto ....................... | 370/401 |
| 6,983,302 B1 * | 1/2006 | Ohashi .......................... | 709/203 |
| 7,149,919 B2 * | 12/2006 | Cochran et al. .................... | 714/4 |
| 7,231,417 B2 * | 6/2007 | Narasimhan et al. ......... | 709/203 |
| 2003/0005130 A1 * | 1/2003 | Cheng ........................... | 709/228 |
| 2003/0167329 A1 * | 9/2003 | Kurakake et al. ............. | 709/226 |
| 2004/0049574 A1 * | 3/2004 | Watson et al. ................. | 709/224 |
| 2004/0098715 A1 * | 5/2004 | Aghera et al. ................. | 717/173 |
| 2006/0020525 A1 * | 1/2006 | Borelli et al. ................... | 705/34 |
| 2006/0265483 A1 * | 11/2006 | Wang et al. .................... | 709/223 |

FOREIGN PATENT DOCUMENTS

| | | |
|---|---|---|
| GB | 2 354 350 A | 3/2001 |
| GB | 2 371 646 A | 7/2002 |

OTHER PUBLICATIONS

K. Chan et al, COPS Usage for Policy Provisioning (COPS-PR), IETF RFC, Mar. 2002, pp. 1-24, XP002183187.
D Durham et al, "RFC 2748—The COPS (Common Open Policy Service) Protocol" IETF RFC, Jan. 2000, pp. 1-38, XP002217422.

* cited by examiner

*Primary Examiner* — Peling A Shaw
*Assistant Examiner* — Thomas Richardson
(74) *Attorney, Agent, or Firm* — Sughrue Mion, PLLC

(57) ABSTRACT

The invention proposes a transaction process for the provisioning of rules in a network which includes at least one rule server and one rule server client. The process includes a first stage of transmission from the server to the client of a request for acceptance of the provisioning of a set of rules. The process also includes a second stage of reservation by the client of the resources necessary for the reception and the putting into application of the rules if the request is accepted by the client. The process includes a third stage of response to the request, from the client to the server, and a fourth stage for provisioning the set of rules to the client if the response to the request is favorable. When the network has several clients, each of the clients responds to the request from the server, and the provisioning stage is executed only if each response is favorable.

19 Claims, 2 Drawing Sheets

TRANSACTION PROCESS FOR THE PROVISIONING OF RULES IN A RULE-BASED NETWORK

Figure 1:
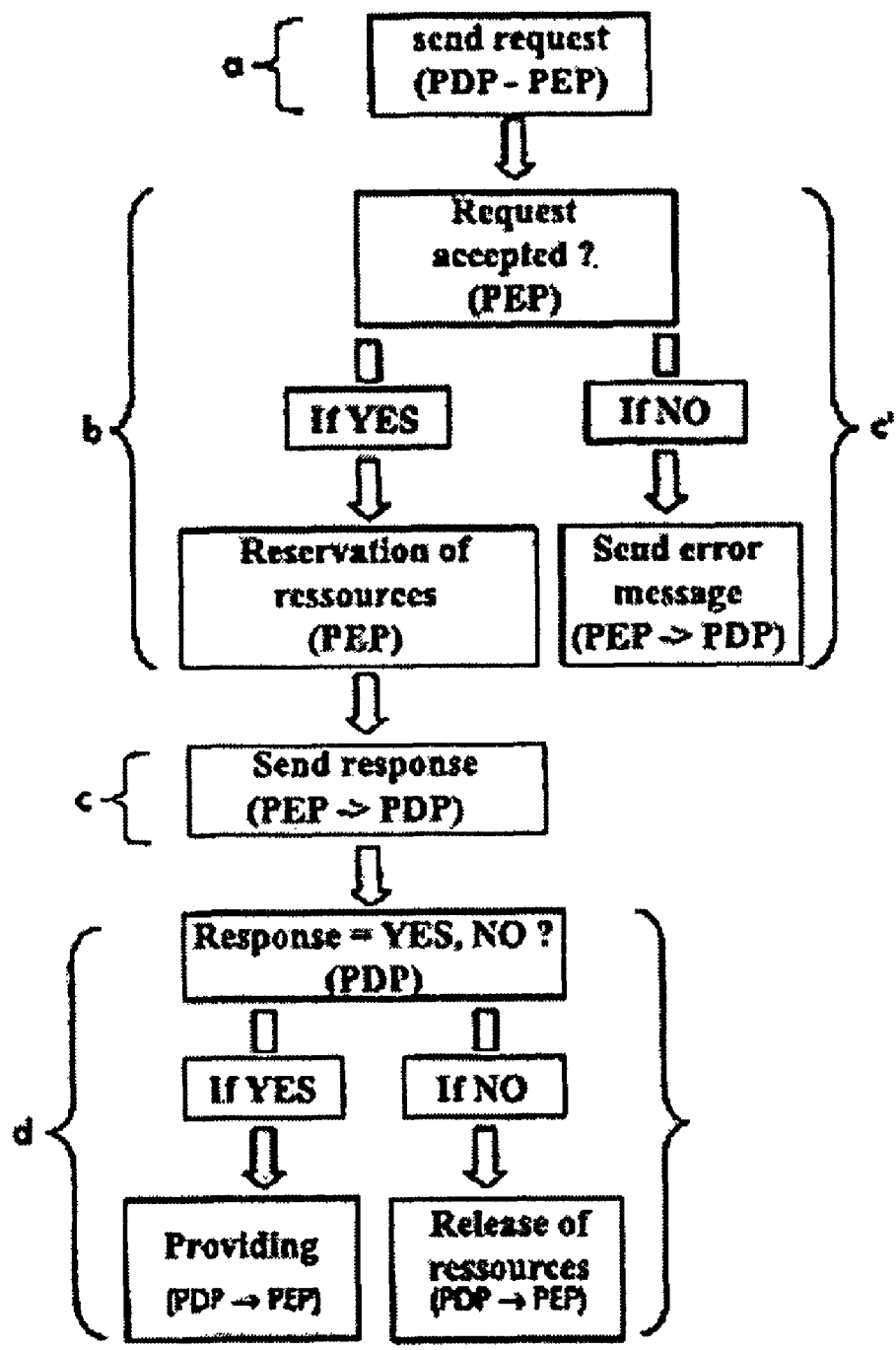

The invention concerns a transaction process for the provisioning of rules in a rule-based network, in particular a network using the IP protocol (Internet Protocol) and the COPS management protocol (Common Open Policy Service Protocol)

We are already familiar with IP networks and the TCP control protocol (Transmission Control Protocol).

We are also familiar with the management (or administration) of policy-based (or rule-based) networks known as PBM (policy-based management), referring to a network management method in which a server transmits, to client appliances, rules which the latter are charged to put into application, in order to optimize transmission of the data and to improve the quality of the service. Given that a policy includes a set of rules, we will therefore henceforth employ the terms "management of policy-based networks" or "management of rule-based networks" without distinction. The management of a rule-based network generally includes the COPS protocol but can also accept the LDAP protocol (Lightweight Directory Access Protocol) in order to fetch provisioning rules from PEP PDP (Policy Enforcement Point/Policy Decision Point).

The COPS protocol is an IP network management protocol of the request/response type, and is based on the TCP protocol. It has been proposed by the IETF (Internet Engineering Task Force) in order to transport rules or policies in the context of rule-based networks (Yavatkar R., Pendarakis D., Guerin R., "A Framework for Policy Based Admission Control", RFC 2753, 2000). The COPS protocol proposes a model for the exchange of rules between elements fitted in the network. For example, the purpose of these rules is to ensure better management of the traffic in the network and, in particular, to improve the quality of service provided on the network. This model uses an architecture of the client/server type. A rule server or PDP (Policy Decision Point) is a piece of network management equipment that prepares rules for the management of traffic, and transmits these rules to clients on the basis of information which is centralized in a database. A rule server client or PEP (Policy Enforcement Point) is a piece of equipment located at a node of the network. It receives information transmitted by a rule server and is charged with putting this into application. These server clients or PEPs are generally routers, switches or firewalls, but they can also themselves be servers communicating with network elements such as routers, switches, computers, etc.

The management of rule-based networks employs rules which determine the behavior of the network. The putting into application of these rules itself involves the definition of roles played by each of the elements in the network and, where appropriate, played by agents of the network. An agent is defined as a physical or virtual entity possessing is own resources, with the ability to perceive and act upon its environment, such as to communicate directly with other agents for example. These agents are divided amongst network elements such as routers, switches, computers, etc., capable of being managed locally by a PEP. A given role can be attributed to a group of elements or agents, meaning that there is always at least one element or agent with such a role. Among the model roles, there are business roles, financial roles and so on. In addition, one or more rules can be associated with a role. The definition of these roles is important, since it determines the part of the network affected by the corresponding rules.

The provisioning of services is an operation which consists of provisioning, to an element or an agent in the network, the resources necessary to provide it with access to telecommunication services. In the absence of network management by rules, network operators have to configure the network element by element or agent by agent, in order to provision a service to a client. In this case, if an error occurs or if an operation fails during the provisioning process, an operator is able to manually reverse the provision orders and thus to solve the problem.

Alternatively, this provisioning can be managed locally from a PEP to an element or agent. When one uses the concept of roles, the provisioning of services from an agent or an element of the network depends on the role attributed to it. All the agents or elements with a given role can then automatically benefit from a given type of provisioning. However, if an error occurs or if an operation fails during the provisioning of services from multiple agents in the network, it then becomes necessary to deprovision all of the elements already provisioned.

A known solution to this problem is the manual deprovisioning of all agents by an operator. It is better however to avoid frequently configuring or changing of the configuration of the elements in the network, since such operations reduce the performance of the network and also involve very significant investment in terms of time and operators.

Solutions have also been proposed to secure the provisioning in an element. Such a solution is described in British patent application UK 2 371 646 for example. According to this solution, an element verifies the provisioning request before deploying it. In order to accomplish this, it is equipped with a memory allowing it to restore the original configuration in the event of a problem or of redundant architecture where one module is active while a second is ready to become active when the first meets a problem.

However, this solution is not suitable for at least two reasons. Firstly, it requires a complex architecture of the elements, and therefore an increase in the cost, as well as complex mechanisms to be implemented within the elements. Secondly, it only concerns each element taken individually. In other words, each element itself checks whether the provisioning process is executing correctly or not, and no resource is therefore provided to ensure that all of the elements (or agents) with a given role can correctly implement the provisioning process. We therefore again find the same major drawback as that described previously in the case of a problem on an element, and it can be necessary to deprovision a large number of elements or agents.

There is therefore a need for a provisioning process which will allow us to avoid the deprovisioning of elements in a network.

The invention thus proposes a transaction process for the provisioning of rules in a network that includes a rule server and a server client, where the transaction process includes the following stages: (a) transmission from the server to the client of a request for acceptance of the provisioning of a set of rules; (b) reservation by the client of the resources necessary for the reception and the putting into application of the rules if the request is accepted by the client; (c) a response to the request from the client to the server; and (d) provisioning of all the rules from the server to the client if the response of stage (c) is favorable.

In the preferred embodiment, the invention includes one or more of the following characteristics:

In a network that includes several clients, stages (a), (b) and (c) of the process according to the invention are effected for each of the clients, each responding to the request from the server during stage (c), and provisioning stage (d) is effected only if each response from the clients is favorable.

The process according to the invention also includes a stage (e) for the release of the resources reserved by the clients at stage (b) if a client response is not favorable.

The process according to the invention also includes a stage (c') for the transmission of an error message from the client to the server if the response to the request is not favorable.

In a network which includes a rule manager, the process according to the invention also includes a stage (c") for the transmission from the server to the rule manager of a message that includes at least part of the information contained in the error message sent at stage (c').

In a network that also includes several network elements, clients of the server client, and a network element manager, the reservation of resources by the client at stage (b) is effected following a preliminary communication stage (a') between the server client and the network element manager.

Since the network element manager is an integral part of the server client, then the communications stage (a') is an internal operation within the server client.

The invention also covers a rule server which has the resources to implement such a process.

Figure 2:
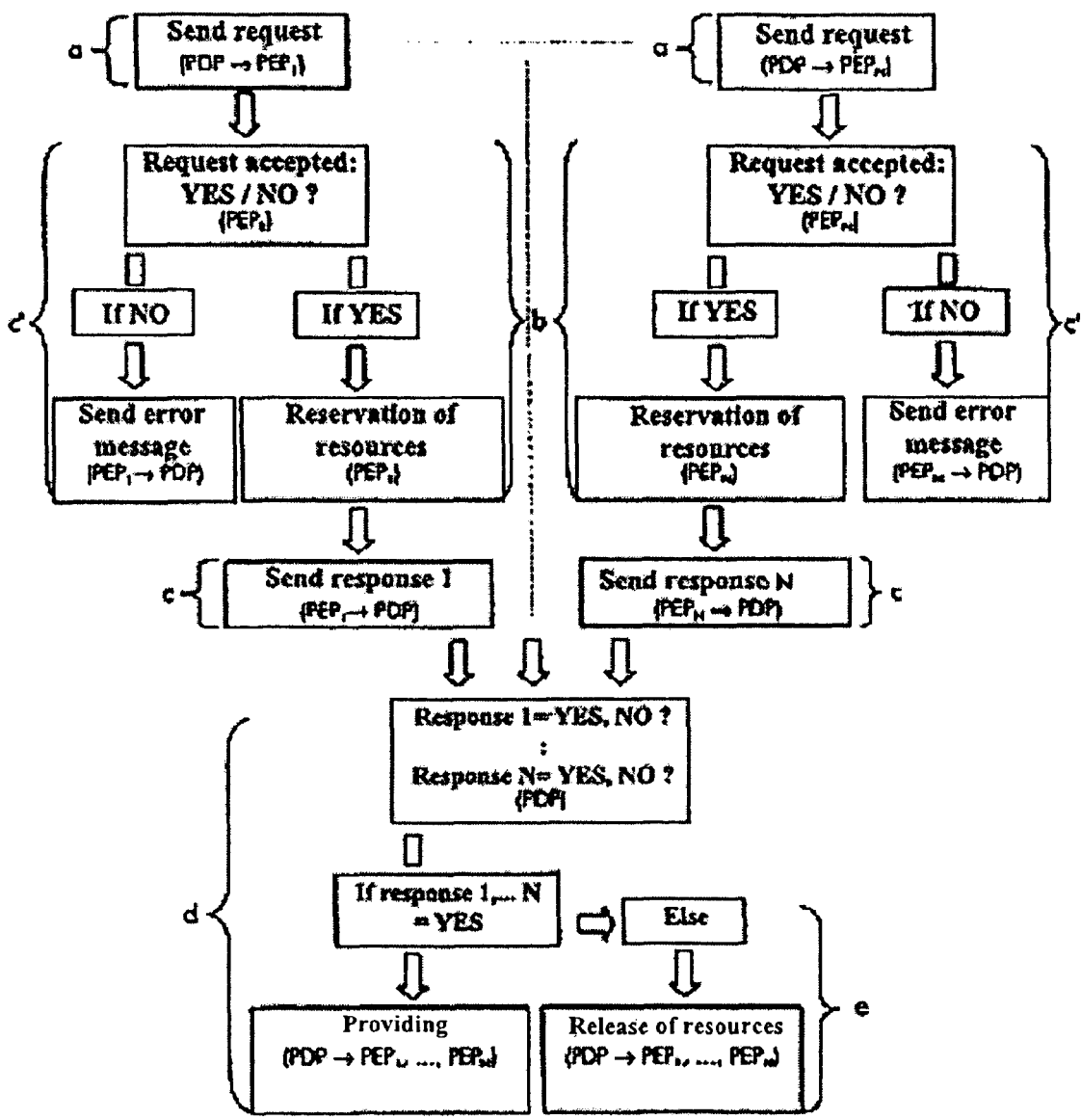

The invention is now described in greater detail, in the following description of a currently preferred embodiment, provided as an example only and with reference to the appended drawings which show:

FIG. 1: a flow chart illustrating stages of the process according to the invention, involving a server and a server client, and FIG. 2: a flow chart illustrating stages of the process according to the invention, involving a server and several server clients.

The invention proposes a transaction process for the provisioning of rules in a network. This network includes at least one rule server (a PDP) and at least one rule server client (a PEP). The transaction process according to the invention includes a first stage of transmission from the server to the client of a request for acceptance of the provisioning of a set of rules. The process includes a second stage of reservation by the client of the resources necessary for the reception and putting into application of the rules if the request is accepted by the client. The process includes a third stage for responding to the request from the client to the server, and a fourth stage for provisioning of all the rules from the server to the client if the response of the client to the request is favorable. Thus, provisioning can be effected only if it has been previously verified by the client that the resources, necessary for the reception and putting into application of the rules, were indeed available. It is therefore possible to avoid a failure or an error during or after the provisioning process, which would require an unnecessarily long and costly deprovisioning operation. Moreover, the use of a transaction mechanism bearing a set of rules guarantees the atomicity of the transaction, both during the response of the client to the request and during the provisioning of the client by the server. The provisioning process therefore enables element deprovisioning in the network to be avoided. When the network includes several clients, each of the clients responds to the request from the server, and the provisioning stage is executed only if each client's response is favorable. The provisioning process thus enables the deprovisioning of several clients to be avoided if any of them responds unfavorably.

FIG. 1 is a flow chart illustrating the stages of the process according to the invention, involving a server and a server client in this example. This server and this server client form a network which therefore has an architecture of the client/server type. The process according to the invention will now be described with reference to the example illustrated in FIG. 1.

The process according to the invention includes a first stage (a) of transmission, from the server to the server client, of a request for acceptance for the provisioning of a set of rules. The request thus involves a transaction concerning a set of rules. This means that it includes general characteristics of this rule-set (such as the resources necessary for the reception and then, where appropriate, for the putting into application or the execution of these rules). In any case, the request does not include the totality of the code and/or of the data necessary for the putting into application or the execution of these rules.

The process includes a second stage (b) for reservation by the client of the resources necessary for the reception and the putting into application of the rules if the request is accepted by the client. For example, the applicable principle can be as follows: the request is accepted by the PEP when the resources available in a local part of the network managed by the PEP are sufficient to allow reception and putting into application or execution of these rules. The reservation of resources is therefore adapted to the request.

The process then includes a third stage (c) for responding to the request from the client to the server. In the present embodiment, the response is explicit, meaning that the PEP sends a response to the PDP.

For example, the client can assign the value YES or any other logical value (e.g. one, yes, true, etc.) to a boolean function and can reserve resources that are appropriate to the request if the request is accepted by the client or the PEP. The process then includes a stage (c) for transmission of the boolean function from the client to the server. The process can further include a stage (c') for the transmission of an error message from the client to the server if the response to the request is not favorable. The transaction is then validated by the PDP when the value of the boolean function is YES in a fourth stage (d). Validation of the transaction takes the form of a provisioning (for example a downloading operation) of all the rules (including their contents) grouped together in the rule-set concerned in the request, with a view to putting into application or execution at a later time.

The assignment of the logical value to the boolean function is effected prior to validation of the transaction. After transaction validation, the codes or the data necessary for the application of all the rules can, for example, be downloaded and/or executed.

Thus the transaction at the server client can be effected only if it has been previously verified that the necessary resources were indeed available, or according to other criteria that the server clients are liable to appreciate, such as the state of the network (the traffic, for example) or part of the network. A failure or an error is therefore avoided during the provisioning (during the downloading for example) or after the provisioning (when putting into application), which would require an unnecessarily long and costly deprovisioning operation. Furthermore, the use of a transaction mechanism concerning a set of rules guarantees the atomicity of all the rules which must be provisioned by the PDP. The atomicity of the rule-set is as applicable to the stage of response to the request (for example when the PEP verifies that the necessary resources are indeed available) as to the stage of transaction validation, leading to putting into application of the rules.

In a variant, the response of the client to the server is implicit. In such a case, the server considers that the response from the client is a default response after the expiry of a predetermined period of time for example. The default response may be favorable, and if the server does not receive any counter-order during this same predetermined period of time it considers that the response is favorable when the said time has expired.

FIG. 2 is a flow chart illustrating the stages of the process according to the invention, this time involving a server and several server clients. In fact, it is best to consider the invention in such a manner that if the network includes N server clients or PDPs (where N is any integer), a request is sent by the server to each of the clients or PEPs (stage a), making a total of N requests. Between 0 and N reservations of resources are effected amongst the N server clients, according to the availability of these resources (stage b), and then a response is sent by each of the clients, making a total of N responses. As an example, boolean functions are assigned a logical value corresponding to the response. Then the N responses are sent to the server (stage c) and the transaction is validated at the server (provisioning stage d) only if the N responses examined by the server are favorable. The advantages which flow from the invention therefore increase as N increases. Where appropriate, each of the server clients is liable to send an error message when the request sent at stage (a) is not accepted at the level of each of these clients (stage c'). The server then possesses information necessary for transmission of this information, where appropriate, to an other entity of the network capable of analyzing the cause of the error.

In addition, when at least one of the clients has refused the request sent at stage (a), the server can order the release of the resources (stage e) previously reserved among all of the clients which previously accepted the request. In this present embodiment, this stage of release of the resources reserved by the clients which accepted the request can be indicated explicitly by the server by the transmission of an appropriate message to the server clients.

In a variant, the stage of release of the resources can be effected in an automatic manner, meaning without the need for transmission of the message by the server to the client, at the end of a pre-determined timeout. When this timeout has expired, each server client releases the resources reserved previously.

The process according to the invention can also include a modification of the request and return to the first stage if the response is unfavorable. This means that if at least one PEP refuses the transaction request (for example, the value attributed to the corresponding boolean function(s) is NO in this case), the latter is then not validated by the PDP and the provisioning is not executed. The PDP can nevertheless inform a network entity (such as a rule manager) of this failure. The rule manager can then create or modify one or more rules and transmit these created or modified rules to the PDP, which can then submit a new request to the PEP(s).

An alternative can be not to modify the request but simply to submit it again after a timeout.

Such operations allow the request to be submitted afresh after an examination of the causes of failure, before the rule-provisioning operation takes place. Thus, (i) deprovisioning can be avoided, (ii) an opportunity is provided to modify the request or to run a timeout with a view to submitting it again successfully and (iii) the atomicity of all rules is guaranteed. In particular, modification can aim to adapt the request in accordance with the resources available from the clients, in real time where possible, according to the conditions of use of the part of the network concerned (such as the traffic), for example.

To this end, the process according to the invention can also include another stage (c') for the transmission of an error message from the server client(s) to the server if the response of the client(s) is unfavorable. This stage is later than stage (b). A stage like this is of such a nature as to inform the PDP of the reasons for which an unfavorable response is emitted regarding the request.

As already discussed, the PDP is then able, in its turn, to send a message to another entity in the network, such as a policy or rule manager (stage c", not depicted in FIG. 2). This message can include at least part of the information contained in the error messages sent at stage (c'). The entity in the network receiving the message sent by the PDP can be equipped with the tools necessary to analyze the cause of failure.

In order to bring this about, the process can also include a stage for comparison of the error message with a database containing model error messages. Such a comparison can be effected at the level of a network entity such as a rule manager, and can possibly be elaborated. This means that characteristics of the error message can be analyzed so as to allow the selection, in the database, of a model message offering optimal correspondence with the error message sent. Where appropriate, a failure message can be selected if the optimal model message is rejected, when it is considered, for example, that the level of correspondence is not satisfactory. This selection stage therefore allows an appropriate model message to be selected. To these model messages contained in the database, there correspond model routines which can be used to deal with the error or which can perform an appropriate action at least. When a message is selected in the database, the network entity can order the execution of the associated model routine. Rules can thus be created or modified during the execution of the model routine selected, before being transmitted to a PDP with a view to the transmission of a new request. This creation or modification of rules therefore takes place in a manner which is optimal in relation to the experience already acquired regarding provisioning failure.

The network can also include several network elements (or even network agents) which themselves are clients of a PEP. As such, these elements are able to communicate with the PEP. It is also advantageous to arrange that the response of the PEP should be effected following a stage of communication between the PEP and the network elements or following the consultation by the PEP of a network element manager. Such a manager can in fact be capable of performing configuration and maintenance operations on the elements of the network, after the fashion of an Element Manager Layer (EML). Its functions arrange that the element manager is aware of the state of the elements, in real time where necessary. Consulting it therefore enables the PEP, in its turn, to ascertain the state of the network elements and, on the basis of this information, to form a response, favorable or not, or in other words to accept or reject the request.

Where appropriate, the element manager can be an integral part of the PEP, meaning that the PEP can be capable of performing tasks that are specific to a network element manager. In such a case, the PEP knows the state of the elements of the network, in real time if necessary. The PEP can therefore accept or reject the request on the basis of the knowledge that it possesses regarding the elements of the network.

The PEP can therefore accept or reject the request after ascertaining the state of the part of network that it manages. In particular, the state of this part of network concerns the resources available in this part. Thus (i) acceptance or rejection of the request can occur in the light of the state of the client network elements of the PEP at the moment of reception of the request by the PEP, (ii) deprovisioning is avoided, and (iii) the atomicity of the rule transaction is guaranteed.

However, the invention is not limited to the variants described above, but can take the form of any number of other variations easily accessible to professionals.

The invention claimed is:

1. A transaction process for the provisioning of rules in a network that includes a rule server and a server client, the rule server comprising at least a processor, the transaction process comprising:
   (a) transmission from the server to the client of a request for acceptance of the provisioning of a set of rules, where the client is attributed to a group of clients;
   (b) reservation by the client of the necessary resources for the reception and putting into application of the rules, if the request is accepted by the client;
   (c) response to the request, from the client to the server; and
   (d) provisioning of functional rules from the server to the client if the response in stage (c) is favorable and responses from other client in the group are favorable,
   wherein prior to the provisioning, the client checks whether the provisioning process comprising executing the functional rules will be executed correctly or not in the client, and the client transmits a response indicating that the provisioning process will be executed correctly, the client reserves resources necessary for reception and execution of the rules,
   wherein the favorable responses indicate that the provisioning can be implemented in a respective client and the responses are transmitted prior to the provisioning of the rules on the client by the server, and
   wherein stages (a), (b) and (c) are carried out for each of the clients in the group, each responding to the request from the server during stage (c), and in which provisioning stage (d) with respect to each client is carried out only if each client response is favorable, and
   wherein if the client provides the favorable response and one of other clients in the group does not provide a favorable response, the client is not provisioned, and
   wherein the network further comprises a rule manager that modifies one or more rules in the set of rules if one of the clients responds unfavorably and provides the modified set of rules to the server for transmission to the client.

2. A process according to claim 1, further comprising a stage (e) for releasing the resources reserved by the clients at stage (b), if a response from at least one of the client is not favorable.

3. A process according to claim 1, which also includes a stage (c') for the transmission of an error message from the client to the server if the response to the request is not favorable.

4. A process according to claim 3, where the process further comprises a stage (c") for transmission from the server to the rule manager of a message that includes at least part of the information contained in the error message sent at stage (c').

5. A process according to claim 1, where the network also includes:
   several network elements which are clients of the server client, and
   a network element manager,
   in which reservation of the resources by the client at stage (b) is effected following a preliminary stage (a') of communication between the server client and the network element manager.

6. A process according to claim 5, where the network element manager is an integral part of the server client, and in which the communication stage (a') is an operation within the server client.

7. The process according to claim 1, wherein the provisioning comprises configuring the client with the rules from the server.

8. The process according to claim 1, wherein prior to the provisioning, each of the clients in the network receives an inquiry from the server and transmit a response regarding whether the corresponding client has the necessary resources to execute the provisioning of the rules from the server.

9. The process according to claim 1, wherein:
   the provisioning of the rules from the server is applied to the client and at least one additional client,
   the provisioning of the rules from the server is not applied to the clients when one of the clients cannot execute the provisioning correctly.

10. The process according to claim 9, wherein:
    prior to the provisioning and after the check, each of the clients transmits a response to the server indicating whether the provisioning process will be executed correctly or not, and
    waiting by the server for the response from each of the clients and based on the responses received from all the client, the server determines whether to execute the provisioning of the rules.

11. The process according to claim 10, wherein when one of the clients transmits a response to the server indicating that provisioning process cannot be executed correctly, the server determines not to execute the provisioning of the rules on all of the clients and instructs the remaining clients to release resources reserved for the provisioning of the rules.

12. The process according to claim 10,
    prior to the provisioning, each of the clients checks whether the provisioning process will be executed correctly or not in the respective client, and
    the provisioning of the rules from the server is not applied to the clients when one of the clients cannot execute the provisioning correctly.

13. The process according to claim 1, wherein the provisioning of the rules from the server to the client is implemented only after the server receives the favorable response from the client and wherein the request for acceptance of the provisioning of the set of rules includes general characteristics of the set of rules without providing data necessary for implementing actual provisioning of the rules.

14. The process according to claim 1, wherein the necessary resources are the resources used in the provisioning of the rules from the server when the response is favorable.

15. The process according to claim 1, wherein said checking whether the provisioning process will be executed correctly or not comprises determining whether the client is capable of receiving and executing the rules and wherein the group of clients are each provisioned independently by same rules.

16. The process according to claim 1, wherein said checking whether the provisioning process will be executed correctly or not by each of the clients in the group comprises determining whether the resources are available in a local part of the network, which are managed by the server, and whether the resources are sufficient to allow reception and execution of the rules such that same rules are executed in each of the clients in the group.

17. A rule server which has resources to implement a transaction process for the provisioning of rules in a network that includes the rule server and a server client, the rule server comprising at least a processor, the transaction process comprising:
- (a) transmission from the server to the client of a request for acceptance of the provisioning of a set of rules, where the client is attribute to a group of clients and the request includes general characteristics of the rules;
- (b) checking by the client whether the provisioning process will be executed correctly in the client based on the general characteristics of the rules;
- (c) transmitting a favorable response from the client to the server if the client determines that the provisioning process will be executed correctly in the client, and transmitting an unfavorable response if the client determines that the provisioning process will not be executed correctly in the client; and
- (d) provisioning of functional roles from the server to the client if the server receives the favorable response from each client in the group, wherein prior to the provisioning of functional rules, a resource necessary for reception and execution of the functional rules is reserved by the client if the client determines that the provisioning process comprising executing the functional rules will be executed correctly in each client of the group, wherein the responses indicate that the provisioning can be implemented in a respective client and the responses are transmitted prior to the provisioning of the rules on the client by the server, and wherein stages (a), (b) and (c) are carried out for each of the clients in the group, each responding to the request from the server during stage (c), and in which provisioning stage (d) with respect to each client is carried out only if each client response is favorable, and wherein if the client provides the favorable response and one of other clients in the group does not provide a favorable response, the client is not provisioned, and wherein the network further comprises a rule manager that modifies one or more rules in the set of rules if one of the clients responds unfavorably and provides the modified set of rules to the server for transmission to the client.

18. The rule server according to claim 17, wherein said checking whether the provisioning process will be executed correctly or not comprises determining whether the client is capable of receiving and executing the rules and wherein the group of clients are each provisioned independently by same rules.

19. The rule server according to claim 17, wherein said checking whether the provisioning process will be executed correctly or not by each of the clients in the group comprises determining whether the resources are available in a local part of the network, which are managed by the server, and whether the resources are sufficient to allow reception and execution of the rules such that same rules are executed in each of the clients in the group.

* * * * *